United States Patent
Terry et al.

(10) Patent No.: US 10,740,508 B1
(45) Date of Patent: *Aug. 11, 2020

(54) SYSTEM AND METHOD FOR EMPLOYING MODEL REPOSITORY

(71) Applicant: Nationwide Mutual Insurance Company, Columbus, OH (US)

(72) Inventors: Shannon Terry, Upper Arlington, VA (US); Christopher P. Nicholas, Worthington, OH (US); Benjamin A. Ogorek, Columbus, OH (US); Victoria Bondoc, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/650,136

(22) Filed: Jul. 14, 2017

Related U.S. Application Data

(63) Continuation of application No. 15/278,099, filed on Sep. 28, 2016, now Pat. No. 9,734,267, which is a continuation of application No. 14/031,327, filed on Sep. 19, 2013, now Pat. No. 9,483,589.

(60) Provisional application No. 61/702,849, filed on Sep. 19, 2012.

(51) Int. Cl.
| | |
|---|---|
| G06F 17/50 | (2006.01) |
| G06F 30/20 | (2020.01) |
| G06F 16/22 | (2019.01) |
| G06F 111/10 | (2020.01) |

(52) U.S. Cl.
CPC .............. G06F 30/20 (2020.01); *G06F 16/22* (2019.01); *G06F 2111/10* (2020.01)

(58) Field of Classification Search
CPC .............. G06Q 10/06; G06F 17/30345; G06F 17/30289; G06F 17/5009; G06F 30/20; G06F 16/22; G06F 2111/10
USPC .... 703/2; 717/104, 106, 108, 116, 117, 120, 717/126, 127, 135, 138
See application file for complete search history.

(56) References Cited

U.S. PATENT DOCUMENTS

| | | |
|---|---|---|
| 7,761,850 B2 | 7/2010 | Kilian-Kehr |
| 8,015,541 B1 | 9/2011 | Srinivasan et al. |
| 2009/0037363 A1 | 2/2009 | Kozlov et al. |

*Primary Examiner* — Eunhee Kim
(74) *Attorney, Agent, or Firm* — Morgan, Lewis & Bockius LLP

(57) ABSTRACT

Model metadata for each of a plurality of models is stored. The model metadata includes a statistical analysis technique identifier and one or more model input data identifiers. A request to execute a model is received. The request includes data identifying one of the plurality of models, and a model execution start date and end date. On the model execution start date, execution of the model associated with the model execution request is commenced. Outputs of the executed model are stored in a database. The outputs are associated with a model instance identifier, information describing a context for execution of the model, and model output type information. The outputs are retrieved, using the model instance identifier, for analysis.

5 Claims, 17 Drawing Sheets

CREATE MODEL

MODEL NAME

MODEL DESCRIPTION

MODEL PURPOSE

MODEL AUTHOR

MODEL GROUP

BUSINESS EFFECTIVE START DATE

BUSINESS EFFECTIVE END DATE

MODEL REPOSITORY PATH

STATISTICAL MODELING TOOL

ABSTRACT MODEL

[ CREATE ]

| CONSOLE | | | | | | |
|---|---|---|---|---|---|---|
| MODEL ID | MODEL NAME | MODEL DESCRIPTION | MODEL AUTH | GROUP | START | END |
| 1234 | MODEL ABC | WHO TO CONTACT | JOE SMITH | GROUP1 | 9/16/12 | 9/17/12 |
| 567 | MODEL XYZ | PRIORITIZATION OF... | JOE SMITH | GROUP1 | 9/17/12 | 9/18/12 |

FIG. 7

TABLE 1

| MODEL ID | MODELNAME | MODELDESCR | MODEL REPOSITORY PATH | MODEL GROUP ID | BUSINESS EFFSTARTDT | BUSINESS EFFENDDT | CURRENTIND |
|---|---|---|---|---|---|---|---|
| 1 | PREMIUM CHANGE NOTIFICATION (PCN) | THIS MODEL SCORES POLICIES WITH AN UPCOMING PREMIUM CHANGE AT RENEWAL. HIGHER SCORES CORRESPOND... | CMA MODELS-> PREMIUM CHANGE | 1 | 11/11/2011 | 6/17/2012 | N |
| 2 | ON YOUR SIDE REVIEW (OYS) | THIS MODEL SCORES POLICIES WITH AN UPCOMING PREMIUM CHANGE AT RENEWAL AS WELL AS P&C HOUSEHOLDS. HIGHER SCORES... | CMA MODELS-> ON YOUR SIDE REVIEW | 2 | 11/11/2011 | 3/9/2012 | N |
| 9 | ON YOUR SIDE REVIEW (OYS) | THIS MODEL SCORES POLICIES WITH AN UPCOMING PREMIUM CHANGE AT RENEWAL AS WELL AS P&C HOUSEHOLDS. HIGHER SCORES... | CMA MODELS-> ON YOUR SIDE REVIEW | 2 | 3/10/2012 | 12/31/5555 | Y |

FIG. 8

TABLE 2

| MODEL_GROUP_ID | MODEL_GROUP_NAME | MODEL_GROUP_DESCR |
|---|---|---|
| 8 | IAQ | INTERNET ABANDONED QUOTE |
| 2 | OYS | ON YOUR SIDE REVIEW |
| 1 | PCN | PREMIUM CHANGE NOTIFICATION |

FIG. 9

TABLE 3

| SERVER_NAME | CIB_NAME | SCHEDULE_START_DT | CREATE_DTTM | CURRENT_LOAD_DT | START_DTTM | END_DTTM | STATUS |
|---|---|---|---|---|---|---|---|
| serverID | GDW_SPSS_MDL_OYS | 3/10/2012 | 3/10/2012 3:00 AM | 3/10/2012 | 3/10/2012 3:00 AM | | R |

FIG. 10

TABLE 4

| MODEL_INSTANCE_ID | ANLTC_HS_LD_ID | BUSINESS_EVENT | MODEL_OUTPUT_TYPE_ID | BUSINESS_EVENT_DT | MODEL_OUTPUT_VALUE |
|---|---|---|---|---|---|
| 20120310030017-370-AC18A82D-116724 | 100001 | POLICY RENEWAL | 1 | 3/21/2012 | 0.039967 |
| 20120310030017-370-AC18A82D-116724 | 100001 | POLICY RENEWAL | 4 | 3/21/2012 | 14 |
| 20120310030017-370-AC18A82D-116724 | 100002 | POLICY RENEWAL | 1 | 4/21/2012 | 0.00445 |
| 20120310030017-370-AC18A82D-116724 | 100002 | POLICY RENEWAL | 4 | 4/21/2012 | 35 |
| 20120310030017-370-AC18A82D-116724 | 100003 | POLICY RENEWAL | 1 | 3/16/2012 | 0.169721 |
| 20120310030017-370-AC18A82D-116724 | 100003 | POLICY RENEWAL | 4 | 3/16/2012 | 1 |
| 20120310030017-370-AC18A82D-116724 | 100004 | POLICY RENEWAL | 1 | 4/1/2012 | -0.008214 |
| 20120310030017-370-AC18A82D-116724 | 100004 | POLICY RENEWAL | 4 | 4/1/2012 | 49 |
| 20120310030017-370-AC18A82D-116724 | 100005 | POLICY RENEWAL | 1 | 5/13/2012 | -0.004947 |
| 20120310030017-370-AC18A82D-116724 | 100005 | POLICY RENEWAL | 4 | 5/13/2012 | 48 |

FIG. 11

TABLE 5

| SERVER_NAME | CIB_NAME | SCHEDULE_START_DT | CREATE_DTTM | CURRENT_LOAD_DT | START_DTTM | END_DTTM | STATUS |
|---|---|---|---|---|---|---|---|
| serverID | GDW_SPSS_MDL_OYS | 3/10/2012 | 3/10/2012 3:00 AM | 3/10/2012 | 3/10/2012 3:00 AM | 3/10/2012 3:04 AM | C |

FIG. 12

TABLE 6

| SERVER_NAME | CIB_NAME | SCHEDULE_START_DT | CREATE_DTTM | CURRENT_LOAD_DT | START_DTTM | END_DTTM | STATUS |
|---|---|---|---|---|---|---|---|
| serverID | GDW_SPSS_MDL_OYS | 3/10/2012 | 3/10/2012 3:00 AM | 3/10/2012 | 3/10/2012 3:00 AM | 3/10/2012 3:04 AM | C |
| serverID | GDW_SPSS_MDL_OYS | 3/12/2012 | 3/12/2012 3:00 AM | 3/12/2012 | 3/12/2012 3:00 AM | 3/10/2012 3:03 AM | C |
| serverID | GDW_SPSS_MDL_OYS | 3/13/2012 | 3/13/2012 3:00 AM | 3/13/2012 | 3/13/2012 3:00 AM | 3/10/2012 3:07 AM | C |
| serverID | GDW_SPSS_MDL_OYS | 3/14/2012 | 3/14/2012 3:00 AM | 3/14/2012 | 3/14/2012 3:00 AM | 3/10/2012 3:06 AM | C |

FIG. 13

SYSTEM AND METHOD FOR EMPLOYING MODEL REPOSITORY

CROSS REFERENCE TO RELATED APPLICATIONS

This application is a continuation of U.S. patent application Ser. No. 15/278,099 filed Sep. 28, 2016, now U.S. Pat. No. 9,734,267, which is a continuation of U.S. patent application Ser. No. 14/031,327, filed Sep. 19, 2013, now U.S. Pat. No. 9,483,589, which claims the benefit of U.S. Provisional Patent Application No. 61/702,849 filed Sep. 19, 2012, all of which are incorporated by reference in their entireties.

TECHNICAL FIELD

This invention relates to use of repositories to store metadata associated with mathematical models and outputs thereof.

SUMMARY

The present invention relates to a computer implemented method, a system and a computer readable medium storing instructions which, when executed by a computer cause the computer to perform the described method. Model metadata for each of a plurality of models is stored. The model metadata includes a statistical analysis technique identifier and one or more model input data identifiers. A request to execute a model is received. The request includes data identifying one of the plurality of models, and a model execution start date and end date. On the model execution start date, execution of the model associated with the model execution request is commenced. Outputs of the executed model are stored in a database. The outputs are associated with a model instance identifier, information describing a context for execution of the model, and model output type information. The outputs are retrieved, using the model instance identifier, for analysis.

BRIEF DESCRIPTION OF THE DRAWINGS

The foregoing summary, as well as the following detailed description of various embodiments, will be better understood when read in conjunction with the appended drawings. It should be understood, however, that the invention is not limited to the precise arrangements and instrumentalities shown.

FIG. 7 is an exemplary user interface that may be used for entering data associated with a model, in connection with an embodiment of the present invention;

FIGS. 8-13 are tables illustrating model data/meta data generated in accordance with an exemplary implementation of the present invention.

DETAILED DESCRIPTION

Figure 1:
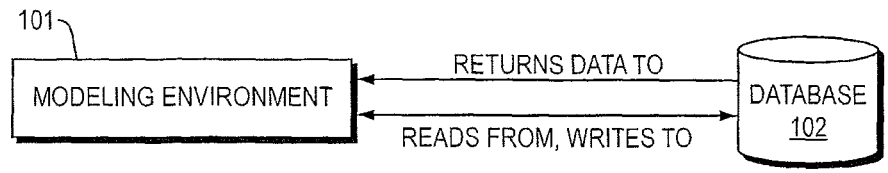
FIG. 1 illustrates the exemplary context in which an embodiment of the invention may be used.

The systems and method described herein relate to predictive and descriptive modeling systems. More specifically, the systems and methods pertain to the creation, storage, retrieval, and maintenance of data and metadata in predictive and descriptive modeling systems. The system creates and maintains model metadata, model executions, and their resulting model outputs. Methods for capturing, classifying, and documenting model inputs and outputs are also provided. The apparatus supports mapping physical or logical structures in a database system via a system catalog to a model for the purpose of defining model inputs. These inputs can be used in a one-to-one mapping or as part of a defined usage context (e.g., a derived field such as an indicator or calculated metric) that may utilize multiple fields or even other mappings. A flexible storage solution may also be provided, which eliminates the need for structural database changes for the deployment of new or updated models. This leads to significant savings of time and money. These structures also facilitate retrieval and ensure consistent application integration via a standard table-based interface. Additionally, the model instance may provide an audit trail including the user, server, server network address, system process identifier, and timestamp for the execution. Outputs from a model execution are tagged with the corresponding model instance identifier, which allows analysts to see the history of models and their scores over time without ambiguity.

Aspects of the present invention provide for a centralized predictive knowledge repository, which contains the sum of an enterprise's predictive experience. Previously, this knowledge was tacit, existing in the minds of employees or scattered about network drives in unstructured documents and computer code. Consistency and structure are provided by embodiments of the invention. In particular, regardless of the type of predictive model used, or the inputs or outputs of model, the model metadata and model outputs are stored and managed. Previously, ad-hoc database structures had to be built for new models. Among the other advantages to this structural consistency is that applications consuming the model outputs have a standardized method of retrieval. No matter how the underlying predictive model changes, the retrieval of outputs remains consistent. This is advantageous because it reduces development time and deployment cost, and increases speed to market.

Some aspects of the present invention provide real-time operating ability, in terms of optimized score management processes, output structure and accessibility.

As a knowledge repository, the process starts when the modeler enters data into an application via, for example, a web-based user interface. Once entered, model information is available to the enterprise and linked to the outputs produced by each model. Information that may be captured includes the predictive technique, the model author, and the data used as inputs to the models.

Regardless of the modeler's inputs describing the predictive model, every new model is assigned a model identifier, or Model_Id, that uniquely identifies the model. Models built for a related purpose are also assigned a Model_Group_Id. Start and end dates determine a predictive model's lifetime. An identification strategy such as this one is key to enabling effective consumption of the resulting model scores and measuring effectiveness.

Every time the model runs, an instance identifier is created, called the Model_Instance_Id, which directly precedes the execution of the model. A creation date-time is logged and a status field is set to "R" (running). A user can view the data at this time, observe that a particular model is running, find out on what server it is running on, and view other completed instances to understand how long the model will take to finish. If the model completes successfully, the instance record is updated and the status field is reset to "C" (complete). A communication may be sent to interested parties upon completion of the model execution.

When a model successfully operates, its outputs are stored in the application and are retrievable using Model_Instance_Id as a key. This allows for analytic evaluation of a model's scores over time, and ultimately its historical performance. Application layers (e.g., views or semantic layers) store the most recent scores in a format convenient to consuming software applications, which greatly improves the performance of consuming applications, particularly when large data volumes are involved.

Figure 2:
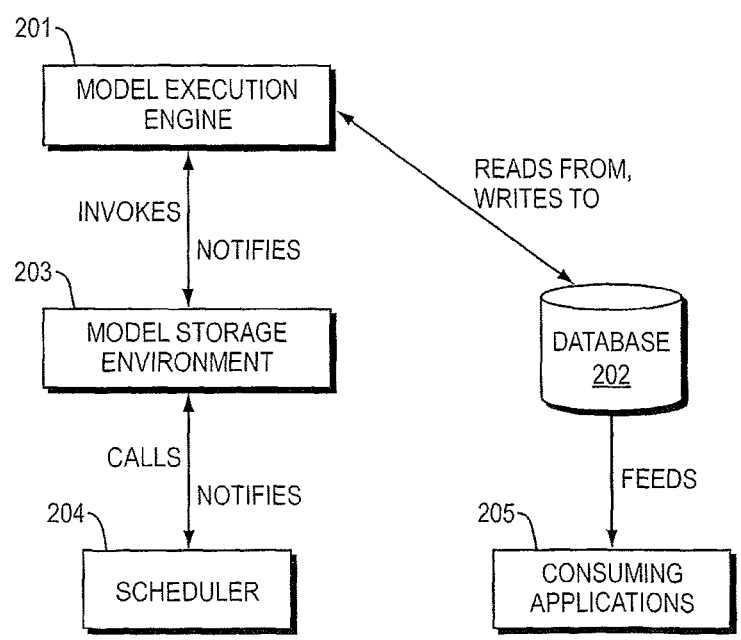
FIG. 2 illustrates the components of a production model execution environment in accordance with one embodiment of the invention.

FIG. 1 illustrates the context in which embodiments of the invention may be used. In particular, the context is one in which modeling environment 101 is functionally dependent on a database 102, both reading data from and writing data back to the database 102. FIG. 2 illustrates components of an exemplary production model execution environment, with functional dependencies noted. Thus, FIG. 2 expands on FIG. 1 by showing how a production modeling environment may consist of scheduling and storage components, as well as an execution engine. Thus, FIG. 2 shows that the model execution engine 201 may read and write to a database 202. It may also invoke models from the model storage environment 203, and receive notifications from the model storage environment 203. The model storage environment 203 may call the scheduler 204 and receive notifications from the same. The database 202 feeds data to consuming applications 205.

Figure 3A:
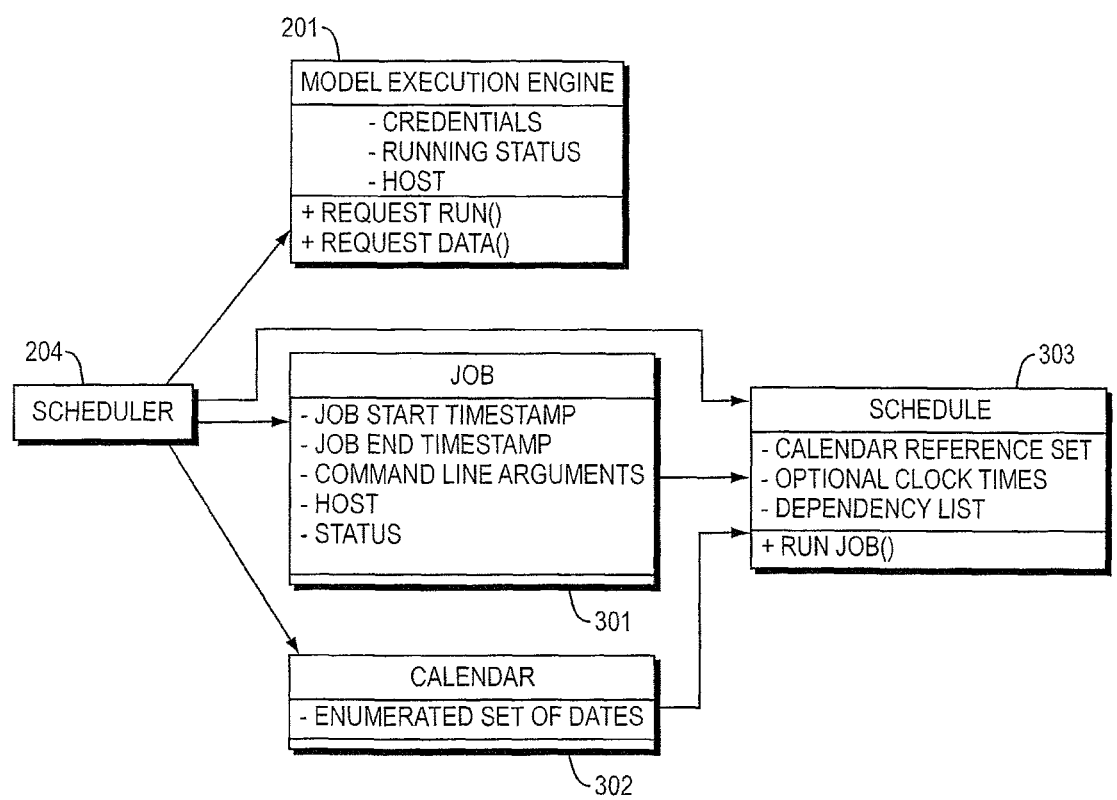
FIG. 3A is a diagram of an exemplary scheduler in accordance with an embodiment of the present invention.
Figure 3B:
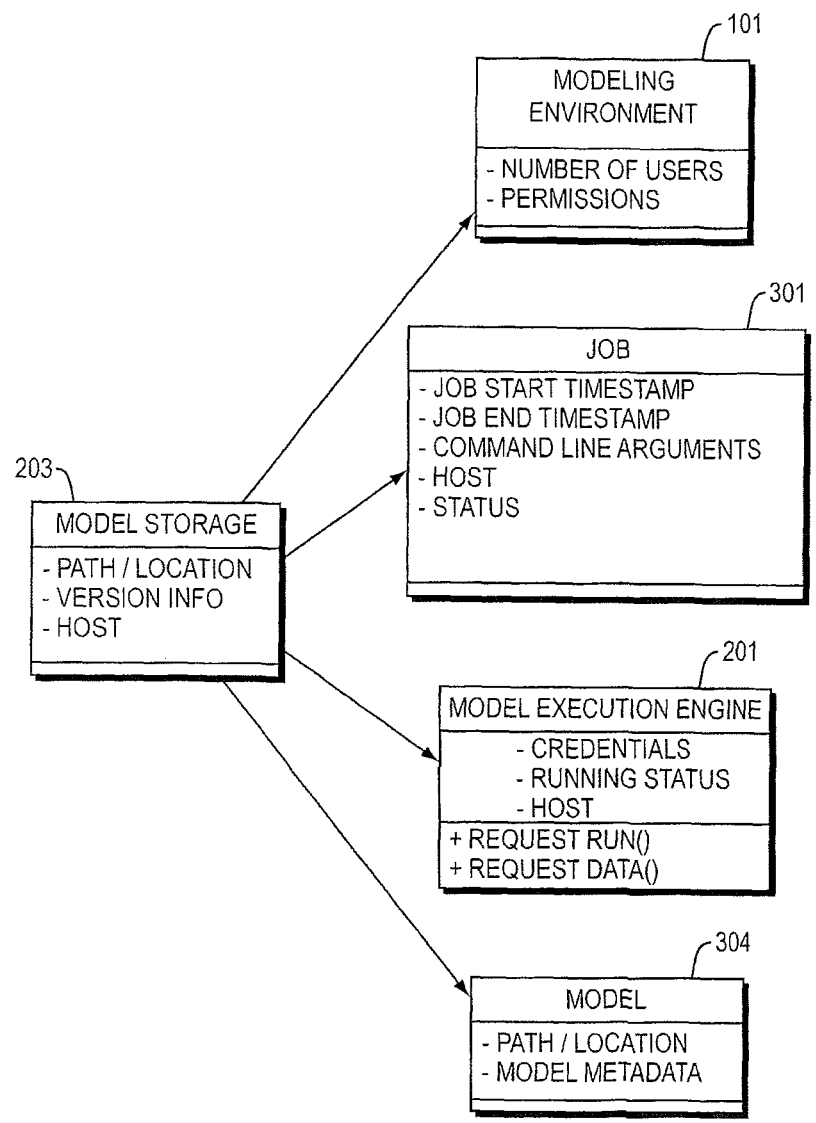
FIG. 3B is a diagram of exemplary components of the model storage system in accordance with an embodiment of the present invention.

FIG. 3A and FIG. 3B each illustrate the dependencies of the scheduler 204 and the model storage system 203, which components are integral to an enterprise-class statistical modeling environment 101. In particular, FIG. 3A is a diagram illustrating a production grade scheduler 204 and its dependencies (i.e., model execution engine 201; job 301; and calendar 302; some of which invoke schedule 303), in accordance with an exemplary embodiment. FIG. 3B is a diagram illustrating the components of model storage system 203 and their dependencies (modeling environment 101; job 301; model execution engine 201; and model 304), in accordance with an exemplary embodiment.

Figure 3C:
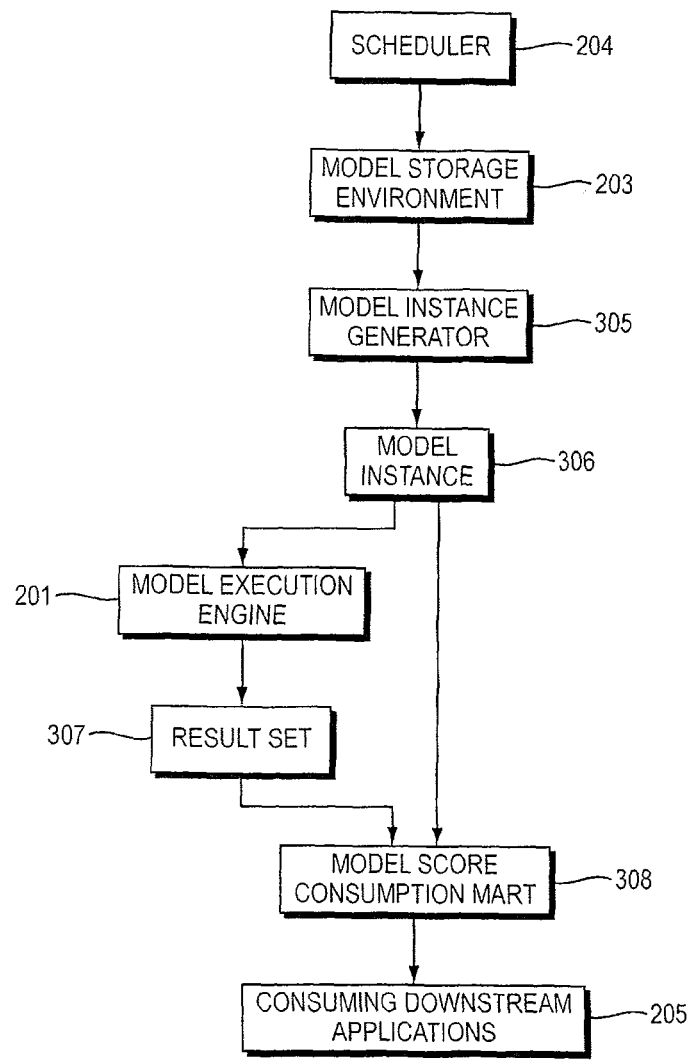
FIG. 3C illustrates an exemplary flow of the proposed modeling environment, which uses the components shown in FIG. 3A and FIG. 3B, in accordance with an embodiment of the present invention.

FIG. 3C is a diagram illustrating an overview of which components within the modeling environment are invoked in connection with the processes described herein. This exemplary flow refers to the basic components shown in FIG. 3A and FIG. 3B, as well as other components. Basically, the scheduler 204 is invoked and contacts the model storage host 203, which obtains the model metadata. The model instance generator 305 generates a model instance 306 which is used to track the execution of the model (model execution engine 201) and the result set 307 of execution. The result set 307 is stored in model score consumption mart 308, where it can be used by downstream applications 205.

Figure 3D:
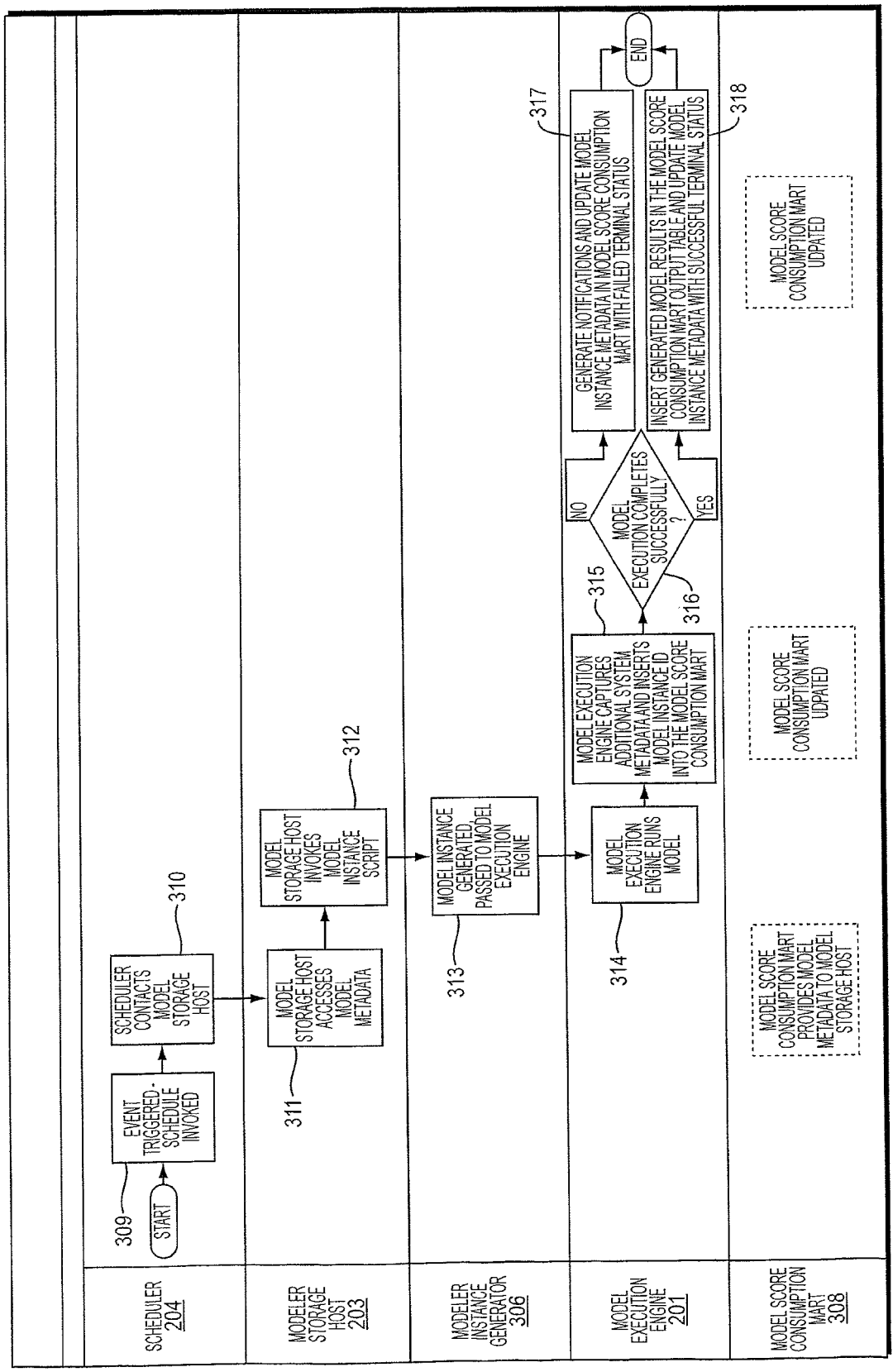
FIG. 3D is a flowchart illustrating the process outlined in FIG. 3C.

FIG. 3D is a more detailed flowchart further illustrating the process outlined in FIG. 3C. In particular, FIG. 3C introduces two solution-specific components, the model instance generator 305 and the model score consumption mart 308 which are used in connection with an embodiment of the present invention. FIG. 3D illustrates the sequence in which these components are active in the process, in an exemplary embodiment. With reference to FIG. 3D, upon the occurrence of a trigger event, schedule 204 is invoked, in step 309. In step 310, the scheduler contacts the model storage host 203. In step 311, the model storage host 203 access model metadata from the model score consumption mart 308. In step 312, the model storage host 312 invokes the model instance script. In step 313, the model instance generator 306 generates the model instance and passes it to the model execution engine 201. In step 314, the model execution engine 201 runs the model. In step 315, the model execution engine 201 captures additional system metadata and inserts the model instance identifier into the model score consumption mart 308. In step 316, it is determined whether the model execution completed successfully. If not, in step 317, notifications are generated and the model instance metadata in the model score consumption mart 308 is updated with failed terminal status. If so, in step 318, the generated model results are inserted in the model score consumption mart 308 output table. Also, the model instance metadata is updated with successful terminal status. The model instance generator 305 and the model score consumption mart 308 comprise the apparatus for executing predictive and descriptive models, whose main features and components are described below.

Model Instance

Figure 4A:
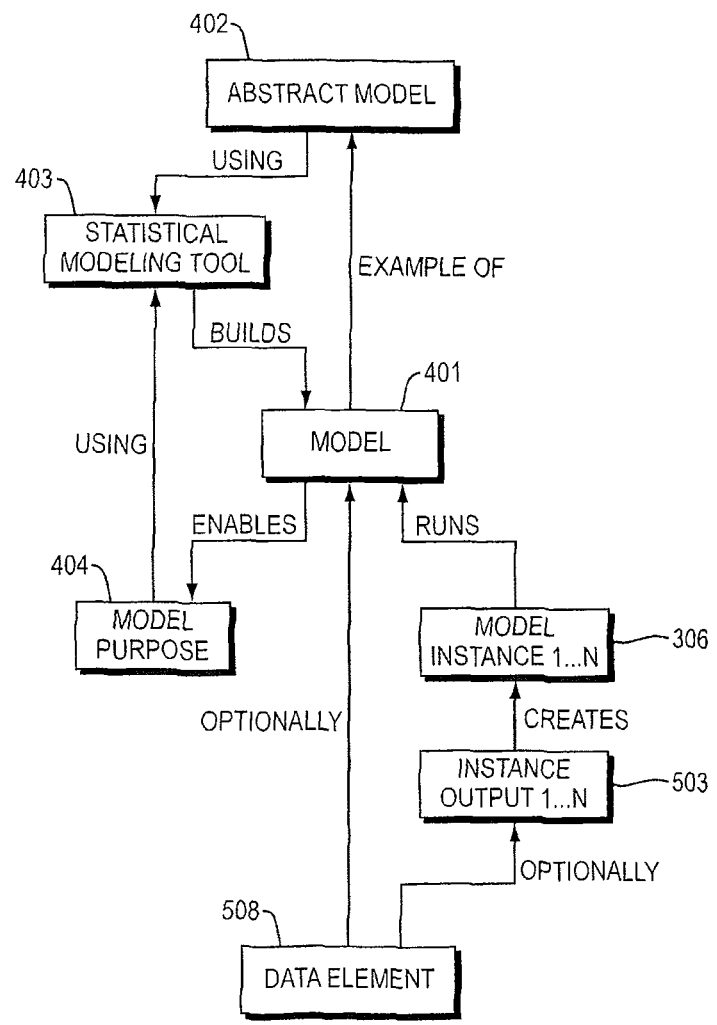
FIG. 4A is an exemplary entity-relationship model of statistical models and their executions, that may be used in connection with an embodiment of the present invention.
Figure 4B:
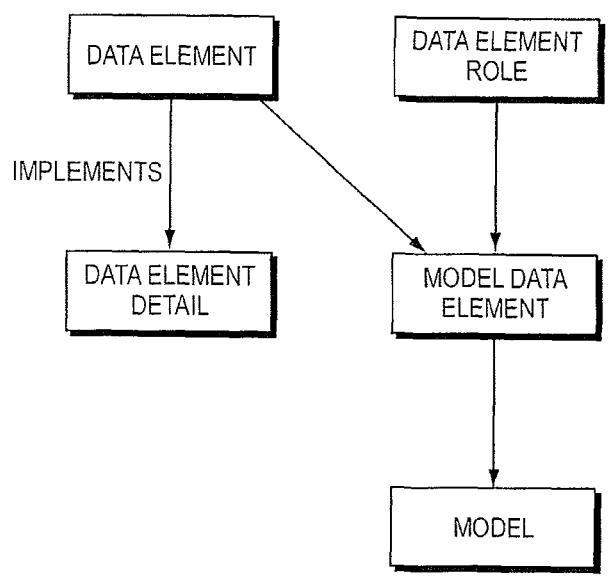
FIG. 4B is an exemplary entity-relationship model describing how the statistical model relates to data within a database, that may be used in connection with an embodiment of the present invention.

The relationship between the statistical model and the application of the model to data is referred to herein as an "instance," or "model instance." FIG. 4A depicts an entity-relationship model of statistical models and how they relate to their instances. Every run of a model creates an instance; one instance may be related to a variety of analytic units and outputs, and many instances may be created over a model's service lifetime. FIG. 4B also illustrates an entity-relationship model but further describes how the statistical model relates to data within a database. Each data element is associated with details and, because a data element may be involved with multiple models, data elements are associated with roles for a particular model, as described in more detail below.

Figure 5A:
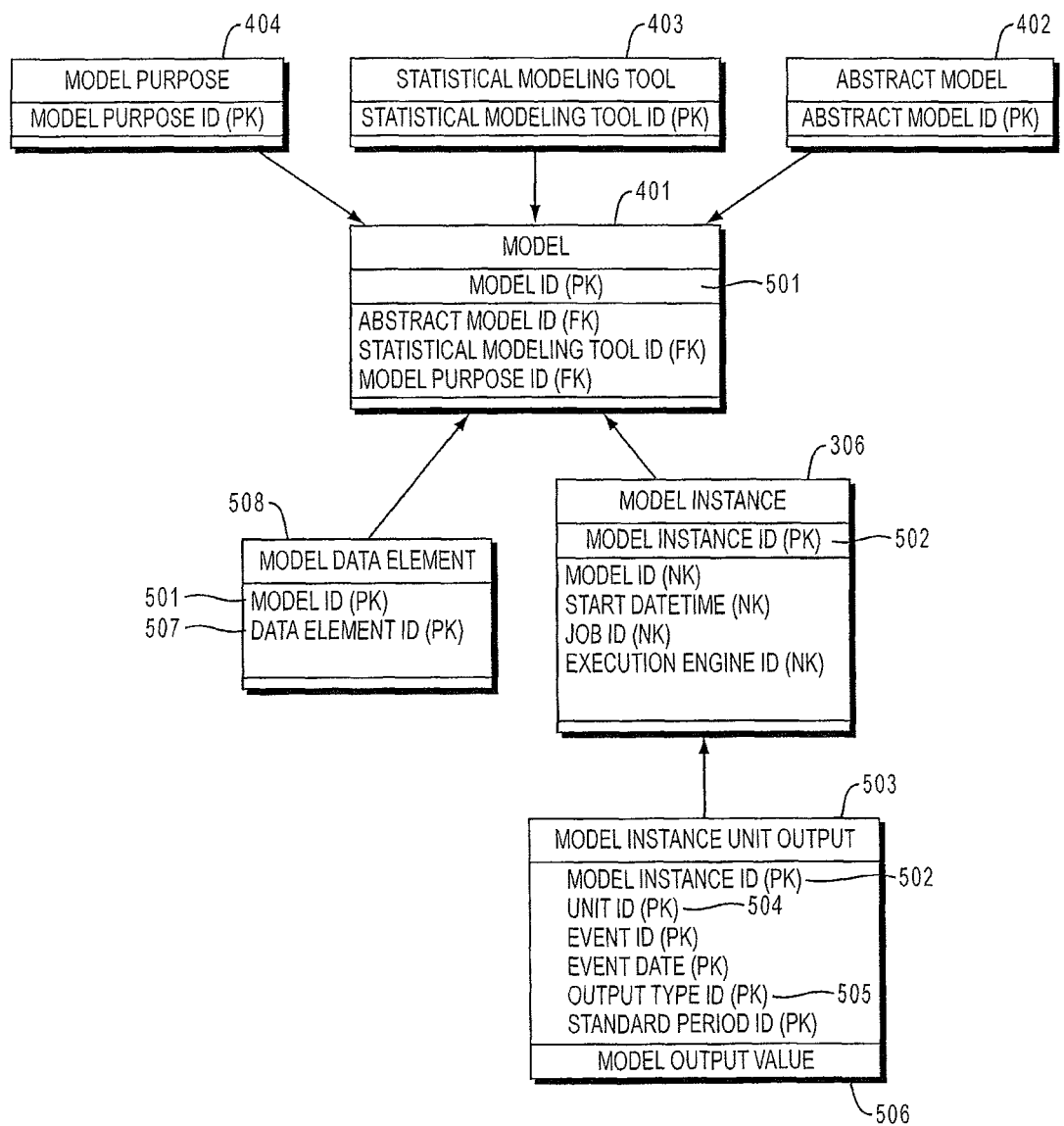
FIG. 5A is a logical data model that may be used in connection with an embodiment of the present invention.

FIG. 5A is a logical data model showing certain (i.e., primary, foreign, and natural) keys for the entity-relationship model of statistical models and their executions. For simplicity, this illustration does not include the model data. A model is uniquely determined by its Model Identifier (Model Id 501). A Model Instance 306, on the other hand, is uniquely determined by the Model Id 501 in combination with a start datetime, a Job Id, and an Execution Engine Id. Here, job refers to the batch program running the model on the execution engine.

To facilitate querying of a particular model instance from the database, the surrogate key Model Instance Id 502 is created. It is designed in such a way that all elements of the natural key (Model Id 501, Start Datetime, Job Id, and Execution Engine Id) may be extracted through parsing the field itself, accomplished through an encoding based on the hexadecimal system.

Model Outputs

The purpose of running a predictive or descriptive statistical model, i.e., creating a Model Instance 306, is to generate outputs that in some way describe an analytic unit of interest. FIG. 4A shows how a Model Instance 306 relates to its outputs. The instance may create many output records, but each output record was created from one and only one Model Instance 306. In the entity-relationship modeling context, a Model Instance Unit Output 503 is represented, where "Unit" stands for a particular subtype of Model Instance Output. Model Instance Unit Output 503 is referred to herein, where abstract units are identified with the attribute "Unit ID" 504.

Figure 5B:
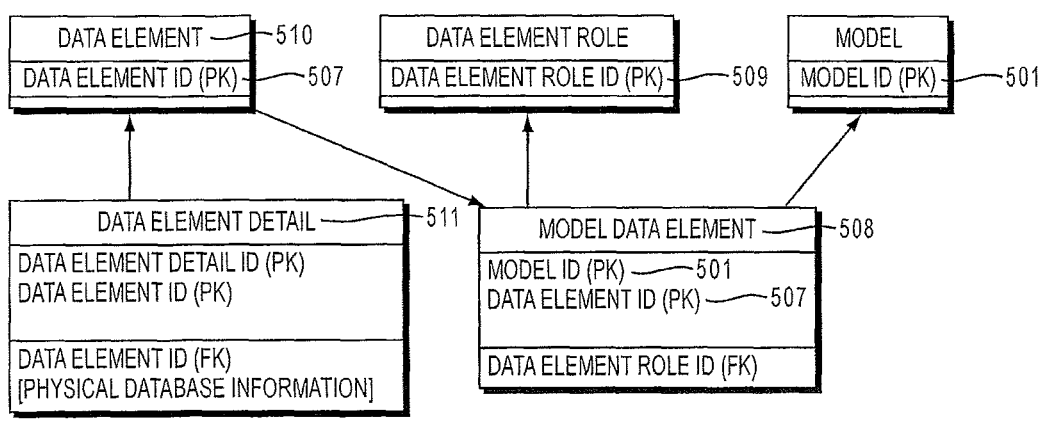
FIG. 5B is a logical data model that may be used in connection with an embodiment of the present invention.

FIG. 5A shows the primary and foreign keys related to the Model Instance Unit Output 503 relation. The Model Instance ID 502 is a component of the key, whereas other components necessary for uniqueness include the unit identifier (Unit ID) 504 and the type of output (Output Type Id 505). FIG. 5B is a logical data model showing certain (i.e., primary, foreign, and natural) keys for the entity-relationship model describing how the statistical model relates to data within a database.

Referring back to FIG. 5A, other contextual information includes Event ID and Event Date. Models are run for a reason. Thus, it is assumed that every event type of interest has a corresponding unique identifier—an Event Id. Because some events are recurring (e.g., an "event" may be a monthly scoring), the event date is an important part of the context. An additional contextual field, "Standard Period Id," includes information on the business relevant time period or frequency.

An attribute of interest in the Model Instance Unit Output 503 relation is the Model Output Value 506. This field contains the outputs of models which in some way describe or make a prediction about the unit of interest (hence, the phrase "predictive and descriptive models").

Model Data

Referring back to FIGS. 4A and 4B, the manner in which a model relates to its data is illustrated. Multiple models may use a particular data element, implying a many-to-many relationship between the Model and the Data Element entities. To remedy this, an associative entity called Model Data Element is created. This entity serves a purpose—one model's predictor may be another model's target of prediction. The Data Element Role entity, functionally related to Model Data Element, indicates the context of the data element in a particular model.

Focusing on the data element, without the context of the model, is the Data Element entity. An important non-key attribute of the Data Element relation is the Data Element Derived Indicator, which indicates whether additional transformations have been applied to database columns to create the data element. If this indicator is false (or 0), then the field is a direct mapping from a column in a physical database to a data element that can be used in a predictive or descriptive model. If the indicator is true (or 1), then some transformation has been applied to a column or columns from the database. In the case that multiple variables are involved, there is a one-to-many relationship between Data Element and the relation Data Element Detail, which includes all the physical database columns used in the creation of the data element. The exact nature of the transformation is not currently specified.

FIG. 5A shows the primary and foreign keys related to the model data component of the Model Score Consumption Mart. The Model relation has one foreign key and unique identifier, Model Id 501, which is paired with the data element identifier, Data Element Id 507, to form the primary key of the Model Data Element table 508. Referring to FIG. 5B, the foreign key within this relation, Data Element Role Id 509, is the unique primary key in the entity, Data Element Role, which provides categorical information about the nature of the data element in the context of the model. Every data element in the Model Data Element 508 relation is also necessarily represented in the Data Element 510 relation, with Data Element Id 507 as the unique primary key.

The primary key of Data Element 510, Data Element Id 507, is also contained in the relation Data Element Detail 511. Since multiple database columns can be used to create a data element, there is a one-to-many relationship here, yet Data Element Id 507 is foreign key rather than a primary key in the Data Element Detail 511 relation. This is because the database column identifier Data Element Detail Id is sufficient to ensure uniqueness and identifiability of all database columns.

Model Metadata

In addition to the production aspects of this apparatus and method for executing predictive and descriptive models, the Model Score Consumption Mart 308 in particular provides a way to document and store metadata about models.

Referring to FIG. 4A, the Model entity 401 has a one to one relationship between the Abstract Model entity 402, the Statistical Modeling Tool entity 403, and the Model Purpose 404 entity.

As shown in FIG. 5A, the primary keys in these entities are all foreign keys in the Model entity 401. The data from the Abstract Model entity 402 is meant to give the analyst an idea of the technique that the predictive or descriptive model was based on. For example, a decision tree-based model will have a different output score distribution than a regression model with continuous predictors; the Abstract Model entity 402 is designed to provide a quick glimpse into the type of model in question. The Statistical Modeling Tool entity 403 provides information about what software was used to estimate the model. Because models are built for many purposes, with descriptive and predictive as two generic categories, the Model Purpose entity 404 is meant to answer the question of why the model was built.

Figure 6A:
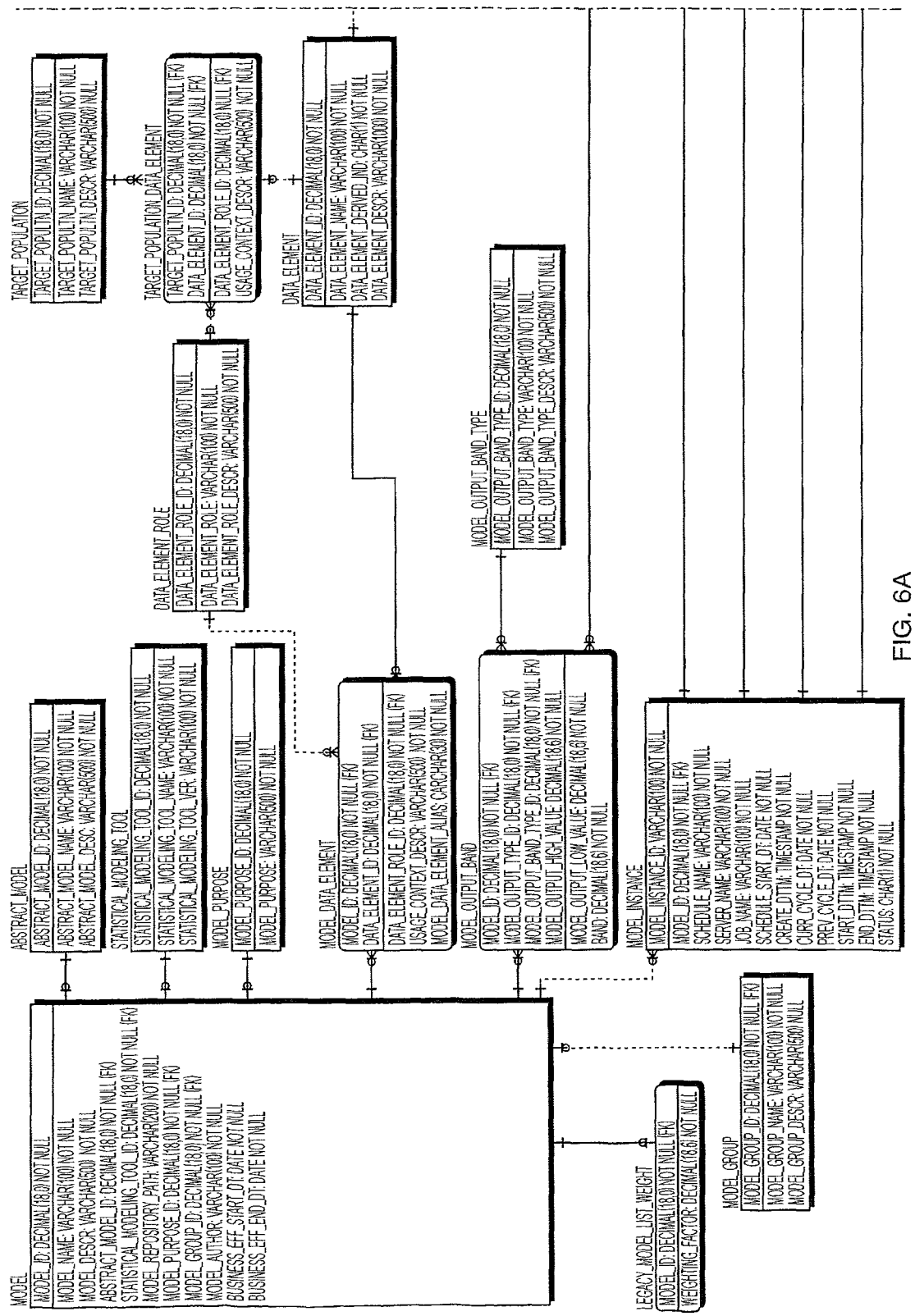
FIGS. 6A and 6B together show an exemplary implementation of a data model that may be used in connection with an embodiment of the present invention.
Figure 6B:
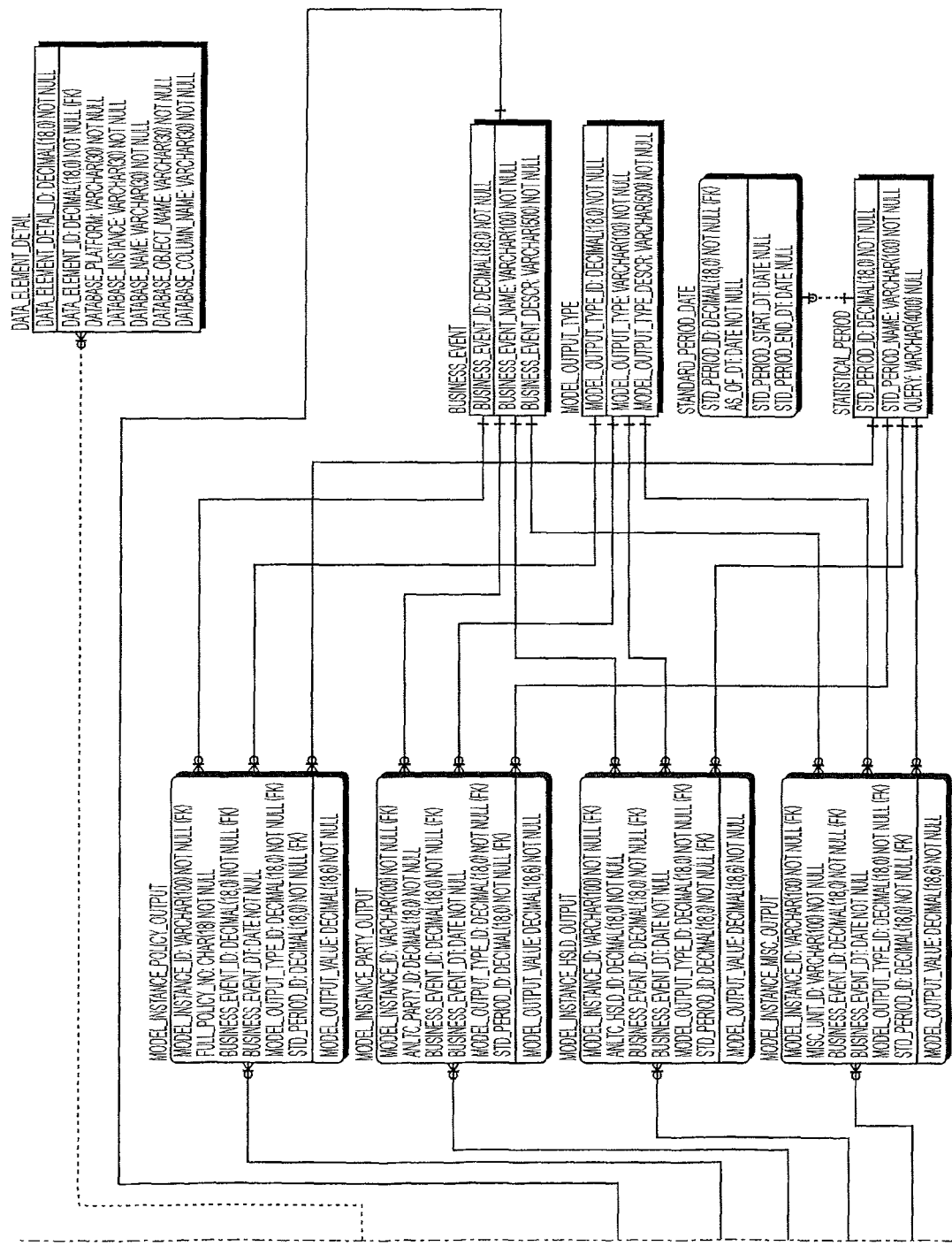

FIGS. 6A and 6B together show an exemplary physical database schematic of the application component of the apparatus. Such a database model is physically instantiated in a production database that is accessible to consuming applications 205.

To facilitate the entry of model metadata into the application, software applications featuring user interfaces may be used. FIG. 7 is an exemplary user interface that may be used in connection with the application for entering model metadata.

The following provides an example of how the systems and methods described herein can be used in connection with a business process referred to herein as OYSR. By way of background, the OYSR model maps a numerical score to customer households with an impending insurance policy renewal, where higher scores correspond to a higher likelihood of a beneficial effect when the proactive activity related to the policy is carried out by an agent. The OYSR model runs nightly, and customer households are scored by the model when an auto or property insurance policy within the household is near renewal.

In the company's predictive modeling environment, in this example, a first iteration of the OYSR model has been running since Nov. 11, 2011. On Mar. 10, 2012, the model is to be replaced with an update built using more recent data. The below describes the implementation using the apparatus described herein and a first run of the model. Note that, in this example, only features of the apparatus necessary to illustrate functionality are described, and certain other metadata fields are omitted.

Before the First Execution

As future executions depend upon the independent entry in the Model table, its information is described first. This information is entered using a user interface, e.g., as in FIG. 7, prior to the first execution of the model. In Table 1 (shown in FIG. 8), note that the updated OYSR model has been assigned Model_Id=9, whereas the previous model edition had been previously assigned Model_Id=2. On the other hand, both models fall under Model_Group_Id=2. Thus the history of the OYSR modeling initiative may be traced back using this field. Previous to the first OYSR model (Model_Id=2) being built, the Model Group information seen in Table 2 (shown in FIG. 9) would have had been filled out.

When a business configuration manager fills enters information about the OYSR model update (Model_Id=9), he sets the business effective dates so that the new model begins on a desired future date, in this case Mar. 10, 2012.

The model has been built with a language that the Model Execution Engine 201 can parse and process. This code is stored in the location specified by Model Storage Path (See FIG. 3B). This path also includes a schedule in which the model will run.

After the business effective start date of Mar. 10, 2012, stored in the Model entity (Table 2), the scheduler follows a previously defined schedule, GDW_SPSS_DLY, stored in the Model Storage Path and named in the Model Instance entity 306 (see also Table 3, FIG. 10). In this example, on Mar. 10, 2012, at 3:00 AM, the schedule is called and the scheduler is invoked, running the job GDW_SPSS_MDL_OYS. This job contacts the Model Storage Host, which collects metadata from the Model table and uses information in the repository to generate a Model Instance Id 502, in this case the string, "20120310030017-370-AC18A82D-116724." A secure encrypted copy of the Model Instance Id 502 is passed to the Model Execution Engine 201, serverID, and the Model Execution Engine 201 inserts a record into the Model Instance Table, as seen in Table 3. This includes the start timestamp of the Model Execution Engine (CREATE_DTTM) as well as that of the initial database insert (START_DTTM). Since the execution has not completed, the field END_DTTM field is left null and the Status is set to the code "R," for "running." At this time, the Model Execution Engine 201 runs the OYSR model code as stored in the Model Storage Path. The OYSR model includes business logic that queries the database for customer households with policy renewals in the near future (45 days or less). The logic also includes retrieves data elements, e.g. customer tenure, and uses these data elements in a mathematical equation to create a propensity score.

The scores themselves are stored in the Model Instance Household Output entity and given MODEL_OUTPUT_TYPE_ID=1, as shown in Table 4, shown in FIG. 11. Scores of this type are associated with the effectiveness of OYSR activities. In addition to the raw model score, a business friendly score is also given, with Model_Output_Type_Id=4. Thus, each of the sample households is associated with two rows instead of one. Finally, the Business Event for the OYSR activity is a policy renewal, and the Business Event date is defined to be the policy renewal date.

After all households are scored, the Model Execution Engine 201 writes the final timestamp END_DTTM in the Model Instance table, as well as updating the status to "C" for complete, as shown in Table 5, FIG. 12. Messages are sent out indicating a successful completion, and consuming applications may now retrieve scores from the Model_Instance_Hsld_Output table, or one of the views in the application layer of the Model Score Consumption Mart 308.

The model will continue to run as defined by the schedule in the Model Storage Host. Table 6 (FIG. 13) shows the Model Instance entity after the updated OYSR model has run multiple times.

Figure 14:
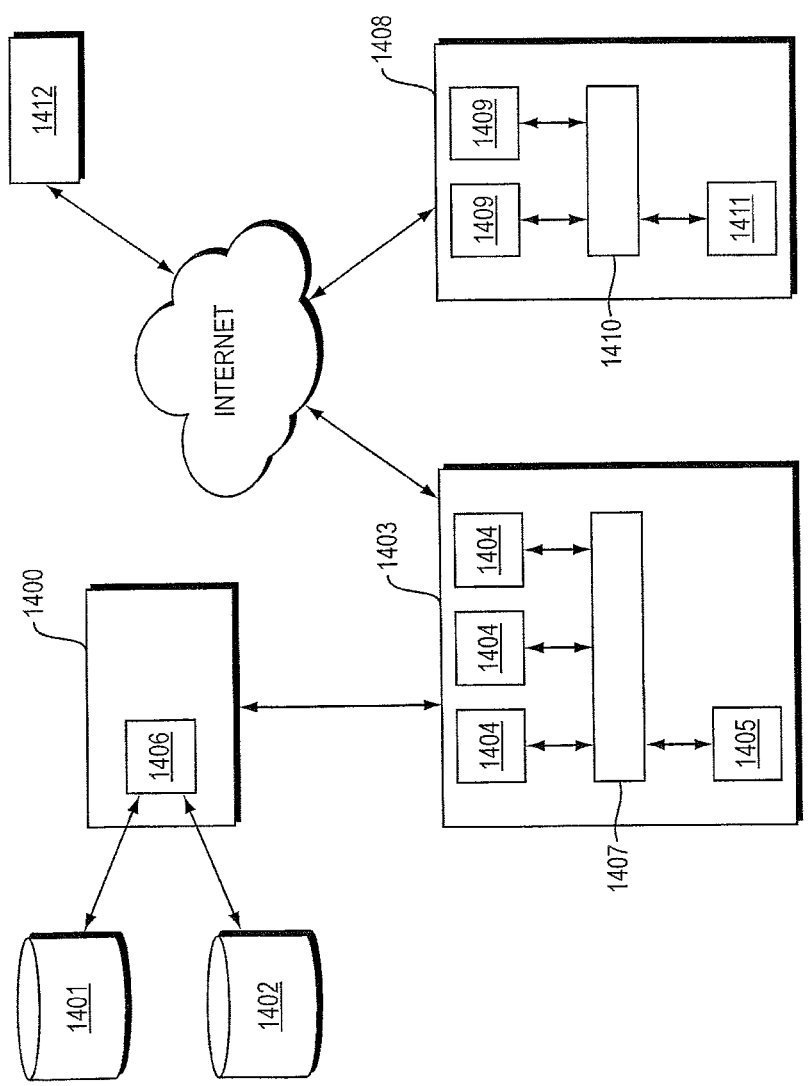
FIG. 14 is a diagram illustrating an exemplary system for carrying out the methods of the present invention.

Exemplary hardware and software employed by the systems are now generally described with reference to FIG. 14. Database server(s) 1400 may include a database services management application 1406 that manages storage and retrieval of data from the database(s) 1401, 1402. The databases may be relational databases; however, other data organizational structure may be used without departing from the scope of the present invention. One or more application server(s) 1403 are in communication with the database server 800. The application server 1403 communicates requests for data to the database server 1400. The database server 1400 retrieves the requested data. The application server 1403 may also send data to the database server for storage in the database(s) 1401, 1402. The application server 1403 comprises one or more processors 1404, computer readable storage media 1405 that store programs (computer readable instructions) for execution by the processor(s), and an interface 1407 between the processor(s) 1404 and computer readable storage media 1405. The application server may store the computer programs referred to herein.

To the extent data and information is communicated over the Internet, one or more Internet servers 808 may be employed. The Internet server 1408 also comprises one or more processors 1409, computer readable storage media 1411 that store programs (computer readable instructions) for execution by the processor(s) 1409, and an interface 1410 between the processor(s) 1409 and computer readable storage media 1411. The Internet server 1408 is employed to deliver content that can be accessed through the communications network, e.g., by end user 1412. When data is requested through an application, such as an Internet browser, the Internet server 1408 receives and processes the request. The Internet server 1408 sends the data or application requested along with user interface instructions for displaying a user interface.

The computers referenced herein are specially programmed to perform the functionality described herein as performed by the software programs.

The non-transitory computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer implemented method comprising:
    storing model metadata for each of a plurality of models, the model metadata comprising a statistical analysis technique identifier and one or more model input data identifiers;
    receiving a model execution request comprising data identifying one of the plurality of models, a model execution start date and a model execution end date;
    commencing, on the model execution start date, and ceasing on the model execution end date, execution of the model associated with the model execution request using a statistical analysis technique associated with the statistical analysis technique identifier and model input data associated with the one or more model input data identifiers;
    storing outputs of the executed model in a database, the outputs being associated with a model instance identifier, the model instance identifier uniquely identifying a model instance used to track the execution of the model and the outputs, the model instance comprising data describing a relationship between the model associated with the model execution request and an application of the model associated with the model execution request to model input data, wherein most recent outputs of the executed model are stored in a layer of the database; and
    retrieving the outputs from the layer of the database, using the model instance identifier as a key, by a consuming application.

2. The computer implemented method of claim 1, wherein the model instance is determined by the model identifier in combination with the model execution start date.

3. The computer implemented method of claim 1, wherein the model instance is associated with a model instance creation date and time.

4. A non-transitory computer readable storage medium having stored thereon computer executable instructions that, when executed on a computer, configure the compute to perform a method comprising:
    storing model metadata for each of a plurality of models, the model metadata comprising a statistical analysis technique identifier and one or more model input data identifiers;
    receiving a model execution request comprising data identifying one of the plurality of models, a model execution start date and a model execution end date;
    commencing, on the model execution start date, and ceasing on the model execution end date, execution of the model associated with the model execution request using a statistical analysis technique associated with the statistical analysis technique identifier and model input data associated with the one or more model input data identifiers;
    storing outputs of the executed model in a database, the outputs being associated with a model instance identifier, the model instance identifier uniquely identifying a model instance used to track the execution of the model and the outputs, the model instance comprising data describing a relationship between the model associated with the model execution request and an application of the model associated with the model execution request to model input data, wherein most recent outputs of the executed model are stored in a layer of the database; and
    retrieving the outputs from the layer of the database, using the model instance identifier as a key, by a consuming application.

5. A system comprising:
    memory operable to store at least one program; and
    at least one processor communicatively coupled to the memory, in which the at least one program, when executed by the at least one processor, causes the at least one processor to perform a method comprising the steps of:
    storing model metadata for each of a plurality of models, the model metadata comprising a statistical analysis technique identifier and one or more model input data identifiers;
    receiving a model execution request comprising data identifying one of the plurality of models, a model execution start date and a model execution end date;
    commencing, on the model execution start date, and ceasing on the model execution end date, execution of the model associated with the model execution request using a statistical analysis technique associated with the statistical analysis technique identifier and model input data associated with the one or more model input data identifiers;
    storing outputs of the executed model in a database, the outputs being associated with a model instance identifier, the model instance identifier uniquely identifying a model instance used to track the execution of the model and the outputs, the model instance comprising data describing a relationship between the model associated with the model execution request and an application of the model associated with the model execution request to model input data, wherein most recent outputs of the executed model are stored in a layer of the database; and retrieving the outputs from the layer of the database, using the model instance identifier as a key, by a consuming application.

* * * * *